UNITED STATES PATENT OFFICE 2,515,909

GLYOXAL-TERTIARY-BUTYL CRESOL CONDENSATION PRODUCTS

Donald R. Stevens, Wilkinsburg, and Arthur C. Dubbs, Springdale, Pa., assignors to Gulf Research & Development Company, Pittsburgh, Pa., a corporation of Delaware No Drawing. Application May 21, 1948, Serial No. 28,524

13 Claims. (Cl. 260—346)

This invention relates to new chemical products and more particularly it concerns glyoxal-tertiary-butyl cresol condensation products obtained as products of reaction between glyoxal and a mono-tertiary-butyl cresol. These products are substantially insoluble in water and in dilute aqueous alkali solutions, but are soluble in varying degrees in a number of organic solvents, such as alcohol, ether, acetone, chloroform, ligroin, gasoline, lubricating oils and other petroleum products.

It is an object achieved by this invention to provide new chemical products resulting from the condensation of glyoxal and a mono-tertiary-butyl cresol.

A further object achieved by this invention is to provide new chemical products adapted to lower the interfacial tension between water and oil.

A still further object achieved by this invention is to provide a process for the production of new chemical products adapted to lower the interfacial tension between water and oil.

Other objects achieved by this invention will become apparent in the following detailed description thereof.

We have discovered that by condensing at least 2 moles of a mono-tertiary-butyl cresol with 1 mole of glyoxal in the presence of a condensation catalyst such as anhydrous hydrogen chloride, we can produce new chemical products which possess the property of lowering the interfacial tension between water and oil, are soluble in oil and are substantially insoluble in water and in dilute aqueous alkali solutions. We have determined that the addition to an oil of only 1.0 per cent by weight of a condensation product obtained in accordance with our invention may reduce the interfacial tension between water and oil as much as 25 per cent. The exact amount of the condensation product required in any case will depend upon the particular condensation product employed as well as upon the characteristics desired in the final oil-water mixture and upon the nature of the base oil chosen. Therefore, we do not wish to limit the invention with respect to the amount of condensation product which may be used. In addition to their property of lowering the interfacial tension between water and oil, the new chemical products of our invention may be utilized as chemical intermediates in the manufacture of plasticizers, pharmaceuticals, detergents, antioxidants, anticorrosion agents and the like.

The oil to which the products of our invention may be added may be derived from a naphthenic, a paraffinic or a mixed base crude oil and it may also contain other "additive" agents, including oiliness and extreme pressure agents, such as aromatic chlorine compounds, stabilized chlorinated paraffins, sulfurized fatty oils, and high molecular weight ketones and esters; viscosity index improvers, such as high molecular weight polymers of isobutylene and the polymers of methacrylic esters, pour point depressants, such as a condensation product of chlorinated wax and naphthalene and a condensation product of chlorinated wax and phenol followed by further condensation of this reaction product with organic acids; detergents, such as nickel naphthenate, metal salts of ethyl hexyl salicylate, and metal salts of alkyl substituted phenol sulfides; foam inhibitors, such as organo-silicon oxide condensation products, organo-silicol condensation products, and organo-germanium oxide condensation products; and corrosion and oxidation inhibitors, such as 2,6-di-tertiary-butyl-4-methyl phenol, triphenyl phosphate, tributyl phosphite, beta-naphthol, and phenyl beta-naphthylamine.

In general, in producing the products in accordance with our invention, we introduce a mono-tertiary-butyl cresol into a reaction vessel containing a glacial acetic acid solution of a condensation catalyst. The glacial acetic acid serves as a common solvent for the reactants. To the solution thus formed we add glyoxal which may be glyoxal per se or an aqueous solution of glyoxal. The molecular ratio of mono-tertiary-butyl cresol to glyoxal is advantageously maintained between about 2:1 and about 6:1. To the solution of reactants thus formed, hydrogen chloride is slowly introduced while maintaining the reactants at about room temperature, i. e. at about 20° to 25° C. After a short time, the temperature is reduced to about 0° to about 5° C. and hydrogen choride is again introduced for a time sufficient to effect formation of a substantial amount of condensation product. The product is then separated from the acid layer and washed with water to remove any remaining acid condensation catalyst and also any remaining acetic acid. The washed product then may be purified by recrystallization from a suitable solvent or by fractionation.

As condensation catalysts, we may employ sulfuric acid, phosphoric acid, anhydrous aluminum chloride, boron trifluoride, boron fluoride complexes, ferric chloride, anhydrous zinc chloride, hydrogen chloride, activated clays such as acid treated fuller's earth, bentonite, floridin and the like. The amount of the condensing agent required may be as little as 1 per cent based on the total weight of the reactants. However, larger amounts, as high as 20 per cent by weight may also be employed. More than about 10 per cent of the condensation catalyst is not ordinarily necessary.

The condensation reaction is carried out at a temperature below about 100° C. and advantageously at a temperature within the range of from about 0° to about 25° C. If the temperature is allowed to exceed 100° C. for an extended period of time, undesirable side reactions may take place.

The following examples will illustrate the general method employed in preparing the condensation products of our invention.

Example I

Into a flask were placed 3 grams of anhydrous zinc chloride. The zinc chloride was then dissolved in 25 ml. of glacial acetic acid. To the solution thus formed were added 65.7 grams (0.4 mole) of o-t-butyl-para-cresol and 19.4 grams of a commercial 30 per cent aqueous solution of glyoxal. The glyoxal equivalent of the commercial solution was 5.8 grams (0.1 mole). With the contents of the flask at room temperature, anhydrous hydrogen chloride was introduced slowly below the surface of the solution for about 45 minutes. The solution was then cooled to between about 0° and 5° C. in an ice bath, after which anhydrous hydrogen chloride was again introduced for about 8 hours. A white crystalline product precipitated out of solution. The white crystals were separated from the solution and recrystallized 3 times from a mixed solvent consisting of about 1 part of acetone and about 3 parts of ethyl alcohol. The purified white crystals thus obtained melted at 190.5° to 191.5° C. Infra-red spectroscopic analysis failed to indicate the presence of the hydroxyl grouping. The condensation product thus obtained has not been definitely identified but it is believed to be either 11,12,dihydro - 2 - methyl - 4 - tert -butylbenzofurano(2,3-b) - 7-tert - butyl - 9 - methylbenzofuran having the following structural formula:

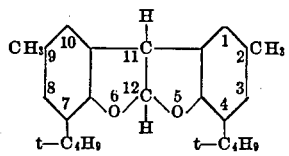

or 11,12 - dihydro-1-tert-butyl-3-methylbenzofurano(2,3-b) - 6 - tert - butyl - 8-methylbenzofuran having the following structural formula:

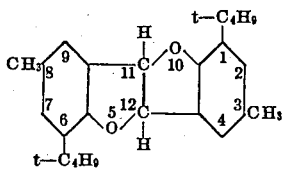

or a mixture of these compounds.

The ultimate analysis of the condensation product as above obtained, compared with the ultimate analysis of the theoretical composition is as follows:

| Ultimate Analysis | Found for Product | Calculated for the above cis and trans configurations |
|---|---|---|
| Carbon | 82.38 | 82.24 |
| Hydrogen | 8.68 | 8.63 |

The product obtained in accordance with Example I was insoluble in water and in dilute aqueous alkali solutions and was soluble in various organic solvents such as alcohol, acetone, ether, chloroform, ligroin, gasoline, lubricating oils and other petroleum products.

Example II

Into a flask were placed 3 grams of anhydrous zinc chloride. The zinc chloride was then dissolved in 25 ml. of glacial acetic acid. To the solution thus formed were added 65.7 grams (0.4 mole) of o-t-butyl-meta-cresol and 19.4 grams of a commercial 30 per cent aqueous solution of glyoxal. The glyoxal equivalent of the commercial solution was 5.8 (0.1 mole). With the contents of the flask at room temperature, anhydrous hydrogen chloride was introduced slowly below the surface of the solution for about 45 minutes. The solution was then cooled to between about 0° and 5° C. in an ice bath, after which anhydrous hydrogen chloride was again introduced for about 5 hours. During the reaction period, a viscous reaction product was formed. The reaction product was diluted with 100 ml. of 85 per cent acetic acid solution and filtered. Upon filtering, a finely divided solid was obtained. The finely divided solid was then washed with two 200 ml. portions of 85 per cent acetic acid. The washing procedure improved the color leaving cream-colored crystals. Purification of the cream-colored crystals yielded fine white crystals having a melting point above 300° C. The crystals were practically insoluble in water. The infra-red spectrum of this compound showed a strong absorption band in the region of absorption due to the hydroxy grouping. The condensation product thus obtained has not been positively identified, but it is believed to be 1,1,2,2-tetrakis(2-methyl-4-hydroxy-5 - t - butylphenyl) ethane having the following probable structure:

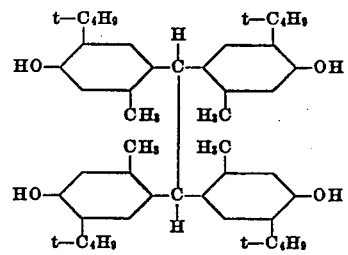

The ultimate analysis of the condensation product as above obtained, compared with the ultimate analysis of the theoretical composition is as follows:

| Ultimate Analysis | Found for Product | Calculated for 1,1,2,2-tetrakis(2-methyl-4-hydroxy-5-t-butylphenyl)ethane |
|---|---|---|
| Carbon | 80.96 | 81.37 |
| Hydrogen | 9.01 | 9.20 |

In order to illustrate the effect on the interfacial tension between water and oil when a condensation product of our invention is added to an oil, the interfacial tension between water and an S. A. E. 20 oil was compared with the same oil containing 1.0 per cent by weight of the condensation product as obtained in Example I. The interfactial tension between the water and oil as measured by a standard DuNuoy tensiometer of the platinum ring type was 51 dynes per centimeter. When the oil contained 1.0 per cent of condensation product as obtained in Example I, the interfacial tension was reduced to 37 dynes per centimeter. From this it can be seen that the condensation products of our invention are effective in lowering the interfacial tension between water and oil when added to an oil in a small amount.

The product obtained in Example II above may also be reacted with compounds such as phosphorus pentasulfide, sulfur chlorides, and the like to form valuable anticorrosion and antioxidant agents.

As has been pointed out hereinabove, the condensation products obtained in accordance with the present invention have not been positively identified. Furthermore, the condensation products may consist of a mixture of compounds which are difficult to separate. Accordingly, the new products provided by the instant invention are herein described and claimed as condensation products rather than as pure chemical compounds.

While our invention has been described above with reference to various specific examples and embodiments, it will be understood that the invention is not limited to such illustrated examples and embodiments and may be variously practiced within the scope of the claims hereinafter made.

We claim:

1. New chemical products obtained by condensing a mono-tertiary-butyl cresol with glyoxal in the presence of a condensation catalyst at a temperature within the range of about 0° to about 100° C.

2. New chemical products obtained by condensing at least 2 moles of a mono-tertiary-butyl cresol with 1 mole of glyoxal in the presence of a condensation catalyst at a temperature within the range of about 0° to about 100° C.

3. New chemical products obtained by condensing between about 2 and about 6 moles of a mono-tertiary-butyl cresol with 1 mole of glyoxal in the presence of a condensation catalyst at a temperature within the range of about 0° to about 25° C.

4. New chemical products obtained by condensing 2 moles of o-tertiary-butyl-para-cresol with 1 mole of glyoxal in the presence of anhydrous hydrogen chloride and zinc chloride at a temperature within the range of about 0° to about 25° C.

5. New chemical products obtained by condensing 4 moles of o-tertiary-butyl-meta-cresol with 1 mole of glyoxal in the presence of anhydrous hydrogen chloride and zinc chloride at a temperature within the range of about 0° to about 25° C.

6. A process for the production of new chemical products comprising condensing a mono-tertiary-butyl cresol with glyoxal in the presence of a condensation catalyst at a temperature within the range of about 0° to about 100° C.

7. A process for the production of new chemical products comprising condensing between about 2 and about 6 moles of a mono-tertiary-butyl cresol with 1 mole of glyoxal in the presence of a condensation catalyst at a temperature within the range of about 0° to about 100° C.

8. A process for the production of new chemical products comprising condensing between about 2 and about 6 moles of a mono-tertiary-butyl cresol with 1 mole of glyoxal in the presence of a condensation catalyst at a temperature within the range of about 0° to about 25° C. for a time sufficient to effect formation of a substantial amount of a condensation product.

9. A process for the production of new chemical products comprising condensing 2 moles of o-tertiary-butyl-para-cresol with 1 mole of glyoxal in the presence of anhydrous hydrogen chloride and zinc chloride at a temperature within the range of about 0° to about 25° C.

10. A process for the production of new chemical products comprising condensing 4 moles of o-tertiary-butyl-meta-cresol with 1 mole of glyoxal in the presence of anhydrous hydrogen chloride and zinc chloride at a temperature within the range of about 0° to about 25° C.

11. A process for the production of new chemical products comprising condensing between about 2 and about 6 moles of a mono-tertiary-butyl cresol with 1 mole of glyoxal in the presence of a condensation catalyst at a temperature within the range of about 0° to about 25° C. for a time sufficient to effect formation of a substantial amount of a condensation product, recrystallizing the condensation product and recovering a substantially water-insoluble, white crystalline product.

12. A process for the production of new chemical products comprising condensing 2 moles of o-tertiary-butyl-para-cresol with 1 mole of glyoxal in the presence of anhydrous hydrogen chloride and zinc chloride at a temperature within the range of about 0° to about 25° C. for a time sufficient to effect formation of a substantial amount of a crystalline product, recrystallizing said crystalline product and recovering a substantially water-soluble white crystalline product.

13. A process for the production of new chemical products comprising condensing 4 moles of o-tertiary-butyl-meta-cresol with 1 mole of glyoxal in the presence of anhydrous hydrogen chloride and zinc chloride at a temperature within the range of about 0° to about 25° C. for a time sufficient to effect formation of a substantial amount of a viscous reaction product, recrystallizing said viscous reaction product and recovering a substantially water-insoluble, white crystalline product.

DONALD R. STEVENS.
ARTHUR C. DUBBS.

REFERENCES CITED

The following references are of record in the file of this patent:

UNITED STATES PATENTS

| Number | Name | Date |
|---|---|---|
| 1,707,181 | Weiler | Mar. 26, 1929 |
| 2,333,548 | Niederl | Nov. 2, 1943 |

OTHER REFERENCES

Dischendorfer, Chem. Abs., vol. 34, 5435 (1940).
Miksic et al., Chem. Abs., vol. 24, 5749 (1930).